US009329851B2

(12) United States Patent
Lalmalani et al.

(10) Patent No.: US 9,329,851 B2
(45) Date of Patent: May 3, 2016

(54) BROWSER-BASED DISCOVERY AND APPLICATION SWITCHING

(75) Inventors: Rahul Jaikrishin Lalmalani, Seattle, WA (US); Jane T. Kim, Seattle, WA (US); Jennifer C. Trahan, Kirkland, WA (US); Marcus A. Lewis, Seattle, WA (US); Mary-Lynne Williams, Seattle, WA (US); Lindsey R. Barcheck, Seattle, WA (US); Warren G. Stevens, Redmond, WA (US); Sarah J. Bowers, Snohomish, WA (US); Mirko Mandic, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 13/229,386

(22) Filed: Sep. 9, 2011

(65) Prior Publication Data
US 2013/0067358 A1 Mar. 14, 2013

(51) Int. Cl.
*G06F 9/48* (2006.01)
*G06F 17/30* (2006.01)
(Continued)

(52) U.S. Cl.
CPC .............. *G06F 8/61* (2013.01); *G06F 3/04812* (2013.01); *G06F 17/30011* (2013.01); *G06F 17/30861* (2013.01); *G06F 3/0484* (2013.01); *G06F 9/4843* (2013.01); *G06F 17/30058* (2013.01)

(58) Field of Classification Search
CPC ............ G06F 7/30011; G06F 7/30014; G06F 3/04812; G06F 3/0484; G06F 8/60; G06F 8/61; G06F 8/65; G06F 9/44526; G06F 9/4843; G06F 17/2235; G06F 17/30011; G06F 17/30058; G06F 17/30861

USPC .......................................................... 715/760
See application file for complete search history.

(56) References Cited

U.S. PATENT DOCUMENTS 5,905,492 A 5/1999 Straub et al.
6,075,528 A 6/2000 Curtis
(Continued)

FOREIGN PATENT DOCUMENTS

CN 102132316 7/2011
JP 2012501498 1/2012
(Continued)

OTHER PUBLICATIONS

StackOverflow. various authors, various discussions in StackOverflow forum. [retrieved] http://stackoverflow.com [on] Dec. 31, 2012 and Jan. 2, 2013. 22 pages.*
(Continued)

*Primary Examiner* — Amy M Levy
(74) *Attorney, Agent, or Firm* — Bryan Webster; Raghu Chinagudabha; Micky Minhas

(57) ABSTRACT

Various embodiments enable a web browser to promote the availability of an installable application that is associated with a website to which the web browser has been navigated. The web browser is configured to discover the availability of these applications and, responsively, provide a user experience through which the user can acquire and install such applications, as well as switch to applications that have previously been installed. Thus, through the various embodiments, a user is relieved of the burden of having to navigate to a particular application store and periodically search for applications associated with sites to which they browse.

23 Claims, 12 Drawing Sheets

(51) Int. Cl.
*G06F 3/048* (2013.01)
*G06F 9/445* (2006.01)
*G06F 3/0481* (2013.01)
*G06F 3/0484* (2013.01)

(56) References Cited

U.S. PATENT DOCUMENTS

| | | | |
|---|---|---|---|
| 6,125,384 A | 9/2000 | Brandt et al. | |
| 6,297,819 B1 | 10/2001 | Furst | |
| 6,401,094 B1 | 6/2002 | Stemp et al. | |
| 6,675,228 B1 | 1/2004 | Bahrs | |
| 6,779,155 B1 | 8/2004 | Bahrs et al. | |
| 7,099,870 B2 | 8/2006 | Hsu et al. | |
| 7,310,775 B2 * | 12/2007 | Cooper et al. | 715/736 |
| 7,313,588 B1 | 12/2007 | Shotton, Jr. et al. | |
| 7,328,405 B1 | 2/2008 | Hyatt et al. | |
| 7,647,562 B2 | 1/2010 | Ghercioiu et al. | |
| 7,689,923 B2 | 3/2010 | Massasso et al. | |
| 7,712,034 B2 | 5/2010 | Gusmorino et al. | |
| 7,895,296 B1 | 2/2011 | Dayan | |
| 7,917,507 B2 | 3/2011 | Kim et al. | |
| 7,996,496 B2 | 8/2011 | Haartsen et al. | |
| 8,046,692 B2 | 10/2011 | Pogrebinsky et al. | |
| 8,065,617 B2 | 11/2011 | Hawkins | |
| 8,209,615 B2 | 6/2012 | Gupta et al. | |
| 8,255,494 B1 | 8/2012 | Boodman et al. | |
| 8,458,612 B2 | 6/2013 | Chatterjee et al. | |
| 2002/0109713 A1 | 8/2002 | Carchidi et al. | |
| 2002/0129064 A1 | 9/2002 | Guthrie | |
| 2003/0018714 A1 | 1/2003 | Mikhailov et al. | |
| 2003/0115167 A1 | 6/2003 | Sharif et al. | |
| 2003/0135558 A1 | 7/2003 | Bellotti et al. | |
| 2003/0222908 A1 | 12/2003 | Bybee et al. | |
| 2004/0088355 A1 | 5/2004 | Hagan et al. | |
| 2004/0237082 A1 | 11/2004 | Alcazar | |
| 2005/0038796 A1 | 2/2005 | Carlson et al. | |
| 2005/0257128 A1 | 11/2005 | Pasquali et al. | |
| 2005/0267869 A1 | 12/2005 | Horvitz et al. | |
| 2005/0289468 A1 | 12/2005 | Kahn et al. | |
| 2006/0015387 A1 | 1/2006 | Moore et al. | |
| 2006/0288011 A1 * | 12/2006 | Gandhi et al. | 707/10 |
| 2007/0101276 A1 | 5/2007 | Yuen | |
| 2007/0208759 A1 | 9/2007 | von Koch et al. | |
| 2007/0250510 A1 | 10/2007 | Nachman | |
| 2007/0282858 A1 | 12/2007 | Arner et al. | |
| 2007/0283273 A1 | 12/2007 | Woods | |
| 2008/0056480 A1 | 3/2008 | Isaacs et al. | |
| 2008/0104195 A1 | 5/2008 | Hawkins et al. | |
| 2008/0195628 A1 | 8/2008 | Kim | |
| 2008/0201367 A1 * | 8/2008 | Kim et al. | 707/104.1 |
| 2009/0006976 A1 | 1/2009 | Im | |
| 2009/0055749 A1 | 2/2009 | Chatterjee et al. | |
| 2009/0076843 A1 | 3/2009 | Graff et al. | |
| 2009/0228469 A1 | 9/2009 | Kim et al. | |
| 2009/0235187 A1 | 9/2009 | Kim et al. | |
| 2009/0248397 A1 | 10/2009 | Garcia | |
| 2009/0248494 A1 | 10/2009 | Hueter et al. | |
| 2009/0282423 A1 | 11/2009 | Smith et al. | |
| 2009/0300137 A1 * | 12/2009 | Tyhurst et al. | 709/217 |
| 2009/0307105 A1 * | 12/2009 | Lemay et al. | 705/26 |
| 2010/0005403 A1 | 1/2010 | Rozmaryn et al. | |
| 2010/0058191 A1 * | 3/2010 | Hawkins | 715/738 |
| 2010/0146379 A1 | 6/2010 | George et al. | |
| 2010/0153544 A1 | 6/2010 | Krassner et al. | |
| 2010/0199190 A1 | 8/2010 | Cadiz et al. | |
| 2010/0201876 A1 | 8/2010 | Lin et al. | |
| 2010/0332996 A1 | 12/2010 | Sarkaria | |
| 2011/0208801 A1 * | 8/2011 | Thorkelsson et al. | 709/203 |
| 2011/0231280 A1 | 9/2011 | Farah | |
| 2011/0276961 A1 * | 11/2011 | Johansson et al. | 717/178 |
| 2012/0060079 A1 | 3/2012 | Hawkins | |
| 2012/0060110 A1 * | 3/2012 | Virmani et al. | 715/771 |
| 2012/0129503 A1 * | 5/2012 | Lindeman et al. | 455/414.1 |
| 2012/0150647 A1 | 6/2012 | Steelberg | |
| 2012/0150663 A1 | 6/2012 | Steelberg | |
| 2012/0233031 A1 | 9/2012 | Chang et al. | |
| 2012/0246573 A1 | 9/2012 | Arokiaswamy | |
| 2013/0067359 A1 | 3/2013 | Lalmalani et al. | |

FOREIGN PATENT DOCUMENTS

| | | |
|---|---|---|
| KR | 100264535 | 10/1998 |
| KR | 20110063633 | 6/2011 |
| WO | WO-0150371 | 7/2001 |
| WO | WO-2006047218 | 5/2006 |
| WO | WO-2010025059 | 3/2010 |

OTHER PUBLICATIONS

Aiglstorfer, R. .Launching Your iPhone App Via Custom URL Scheme. posted Dec. 14, 2008 [retrieved] http://mobiledevelopertips.com [on] Jan. 2, 2013.*

Goecks, et al., "Learning Users' Interests by Unobtrusively Observing Their Normal Behavior", Retrieved at <<http://citeseerx.ist.psu.edu/viewdoc/download?doi=10.1.1.36.651&rep=rep1&type=pdf>>, Proceedings of the 5th international conference on Intelligent user interfaces, Jan. 9-12, 2000, pp. 4.

Boyden, Adam., "No Ifs, Ands or Buts: 10 Things Small Businesses Must Do to Succeed With Their Free Apps", Retrieved at <<http://smallbiztrends.com/2011/03/10-things-small-businesses-must-do-succeed-with-free-apps.html>>, Mar. 14, 2011, pp. 12.

"AppWave™ Browser", Retrieved at <<http://docs.embarcadero.com/products/appwave/appwave_2.x_EN/AppWaveBrowser_2.0AppsUserGuide_EN.pdf>>, Jun. 14, 2011, pp. 38.

"Foreign Office Action", CN Application No. 200980134171.0, (Feb. 17, 2012), 7 pages.

"Foreign Office Action", CN Application No. 200980134171.0, (Aug. 12, 2012), 6 pages.

"Foreign Notice of Allowance", CN Application No. 200980134171.0, (Feb. 16, 2013), 4 pages.

"Extended European Search Report", EP Application No. 09810458.1, (Dec. 21, 2011), 11 pages.

Final Office Action, U.S. Appl. No. 13/653,306, (Jun. 3, 2013), 38 pages.

"Cynergy Unlocks the Hidden Potential of Rich Internet Applications through Cynergy Labs", *Ask Web Hosting*, (Jan. 2008), 3 pages.

"Delivering Rich Internet Applications with Ajax4jsf", *Exadel, Inc.*, (2006),10 pages.

"International Search Report", PCT Application PCT/US2009/054226, (May 20, 2010), 4 pages.

Non-Final Office Action, U.S. Appl. No. 13/653,306, (Jan. 25, 2013), 28 pages.

Notice of Allowance, U.S. Appl. No. 12/200,167, (Jul. 6, 2011), 12 pages.

"StackOverflow Forum", Retrieved from <http://stackoverflow.com/> on Dec. 31, 2012 and Jan. 2, 2013., (2012), 25 pages.

"Steps to Create & Promote RSS Feeds", *RSS Specifications; Note Page, Inc.*, (2004-2007), 2 pages.

"Which Rich Internet Application (RIA) Technology will Lead the Pack", *BETA Daily*, (Mar. 7, 2008), 3 pages.

"Written Opinion of the International Searching Authority", PCT Application PCT/US2009/054226, (Feb. 28, 2011), 4 pages.

Aiglstorfer, Rodney "Launching Your iPhone App Via Customer URL Scheme", Retrieved from <http://mobiledevelopertips.com/cocoa/launching-your-own-application-via-a-custom-url-scheme.html> on Jan. 25, 2013, (Dec. 14, 2008), 37 pages.

Guldman, Andrew "Building Rich Internet Applications with Macromedia Flash MX and ColdFusion MX", (May 2002), 40 pages.

Non-Final Office Action, U.S. Appl. No. 13/295,486, (Aug. 15, 2013), 12 pages.

Final Office Action, U.S. Appl. No. 13/295,486, Jan. 17, 2014, 15 pages.

Non-Final Office Action, U.S. Appl. No. 13/295,486, May 22, 2014, 13 pages.

(56) References Cited

OTHER PUBLICATIONS

Non-Final Office Action, U.S. Appl. No. 13/295,486, Sep. 4, 2014, 14 pages.
Non-Final Office Action, U.S. Appl. No. 13/653,306, May 19, 2014, 30 pages.
Final Office Action, U.S. Appl. No. 13/653,306, Oct. 24, 2014, 22 pages.
Final Office Action, U.S. Appl. No. 13/295,486, Jan. 29, 2015, 15 pages.

* cited by examiner

BROWSER-BASED DISCOVERY AND APPLICATION SWITCHING

BACKGROUND

In some online scenarios, website content can be consumed by both a web browser and by an installable application that has been developed for the website content by a web developer. The installable application typically operates outside the browser context. Such installable applications can, in some instances, be designed by a developer to provide a tailored user experience that is somewhat different than the user experience provided by the web browser. Yet, challenges exist in so far as making users aware of the fact that such applications exist and are available for consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments enable a web browser to promote the availability of an installable application that is associated with a web site to which the web browser has been navigated. The web browser is configured to discover the availability of these applications and, responsively, provide a user experience through which the user can acquire and install such applications, as well as switch to applications that have previously been installed. Thus, through the various embodiments, a user is relieved of the burden of having to navigate to a particular application store and periodically search for applications associated with sites to which they browse.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable a web browser to promote the availability of an installable application that is associated with a website to which the web browser has been navigated. The web browser is configured to discover the availability of these applications and, responsively, provide a user experience through which the user can acquire and install such applications, as well as switch to applications that have previously been installed. Thus, through the various embodiments, a user is relieved of the burden of having to navigate to a particular application store and periodically search for applications associated with sites to which they browse.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Environment

Figure 1:
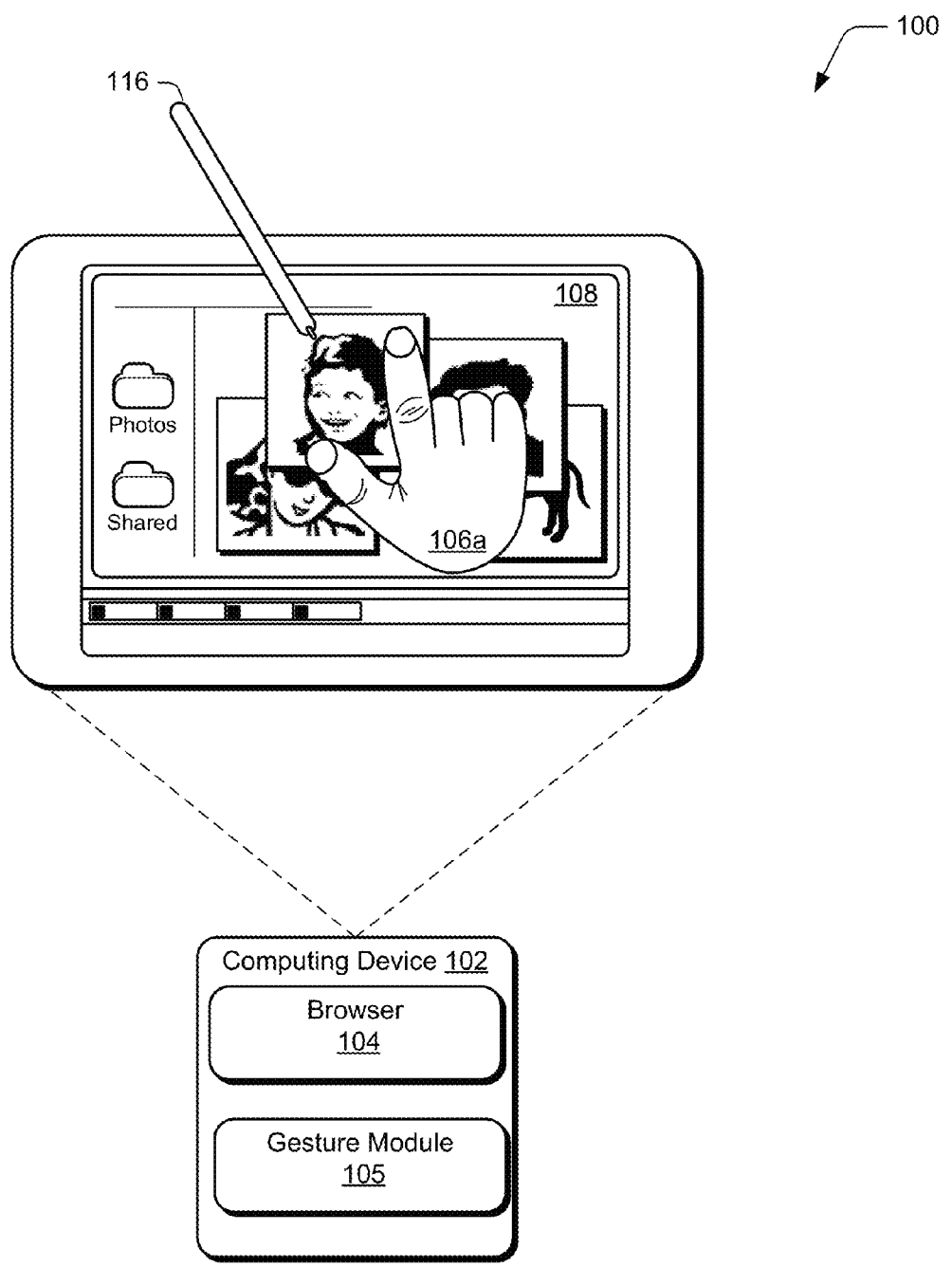
FIG. 1 is an illustration of an environment in an example implementation in accordance with one or more embodiments.

FIG. 1 is an illustration of an environment 100 in an example implementation that is operable to employ the animation techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a web browser 104 to provide functionality as described in this document. The web browser can be implemented in connection with any suitable type of hardware, software, firmware or combination thereof. In at least some embodiments, the web browser is implemented in software that resides on some type of tangible, computer-readable storage medium examples of which are provided below.

Web browser 104 is representative of functionality that enables the user to browse to different websites and consume content associated with those websites. As will be described below in detail, the web browser is configured to promote the availability of an installable application that is associated with a website to which the web browser has been navigated.

The web browser 104 is configured to discover the availability of these applications and, responsively, provide a user experience through which the user can acquire and install such applications, as well as switch to applications that have previously been installed. Thus, through the various embodiments, a user is relieved of the burden of having to navigate to a particular application store and periodically search for applications associated with sites to which they browse. Through the techniques described below, the web browser can enable the user to naturally and easily discover and install applications associated with their browsing habits.

Computing device 102 also includes a gesture module 105 that recognizes gestures that can be performed by one or more fingers, and causes operations to be performed that correspond to the gestures. The gestures may be recognized by module 105 in a variety of different ways. For example, the gesture module 105 may be configured to recognize a touch input, such as a finger of a user's hand 106a as proximal to display device 108 of the computing device 102 using touchscreen functionality. Module 105 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116.

Thus, the gesture module 105 may support a variety of different gesture techniques through recognition and leverage of a division between stylus and touch inputs, as well as different types of touch inputs.

Figure 2:
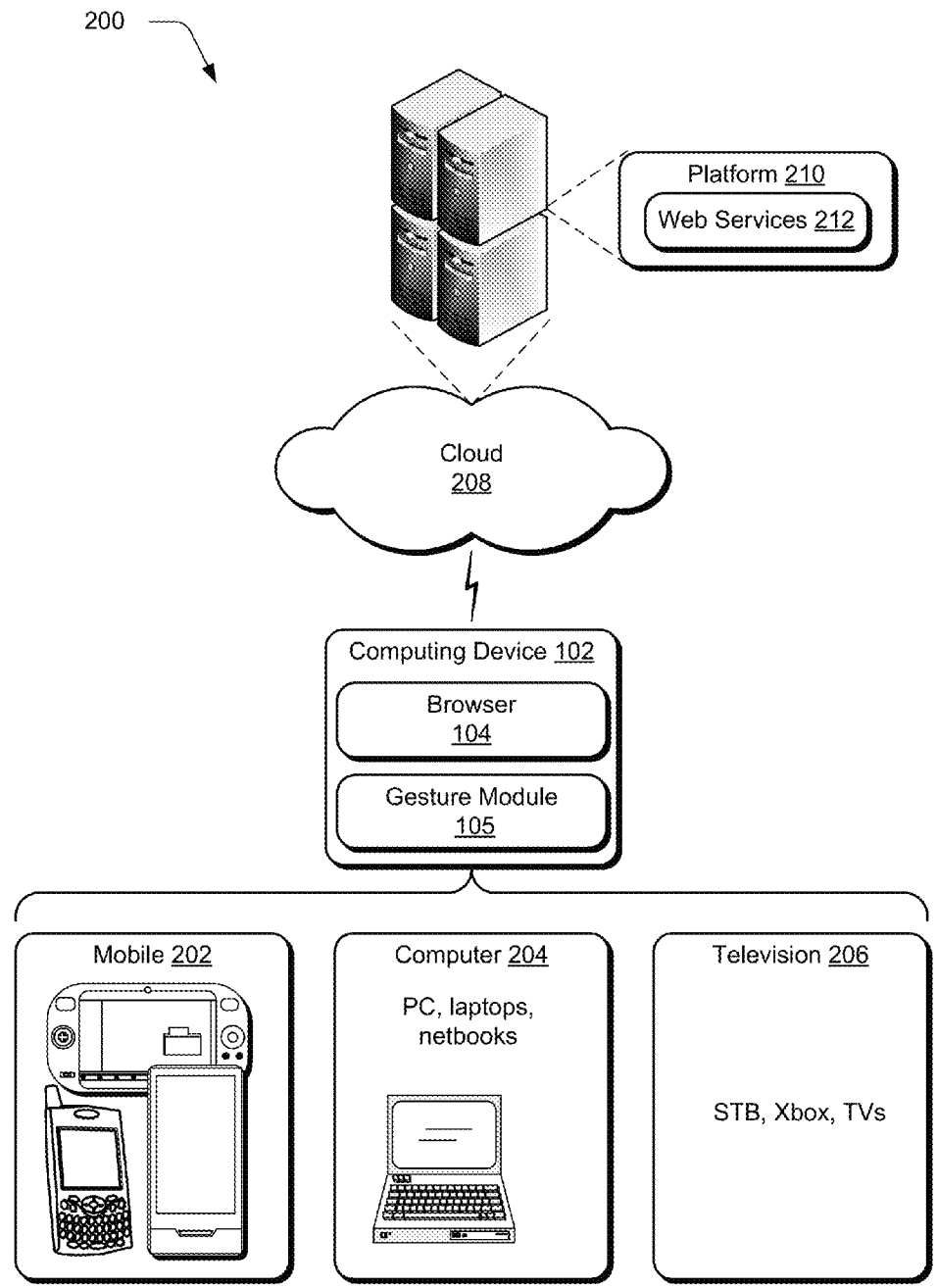
FIG. 2 is an illustration of a system in an example implementation showing FIG. 1 in greater detail.

FIG. 2 illustrates an example system 200 showing the browser 104 and gesture module 105 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe example embodiments. A section entitled "Browser-based Application Discovery" describes how a web browser can discover installable applications in accordance with one or more embodiments. Next, a section entitled "Example Method" describes an example method in accordance with one or more embodiments. Last, a section entitled "Example Device" describes aspects of an example device that can be utilized to implement one or more embodiments.

Having described example operating environments in which the browser can be utilized, consider now a discussion of an example browser in accordance with one or more embodiments.

Browser-Based Application Discovery

Figure 3:
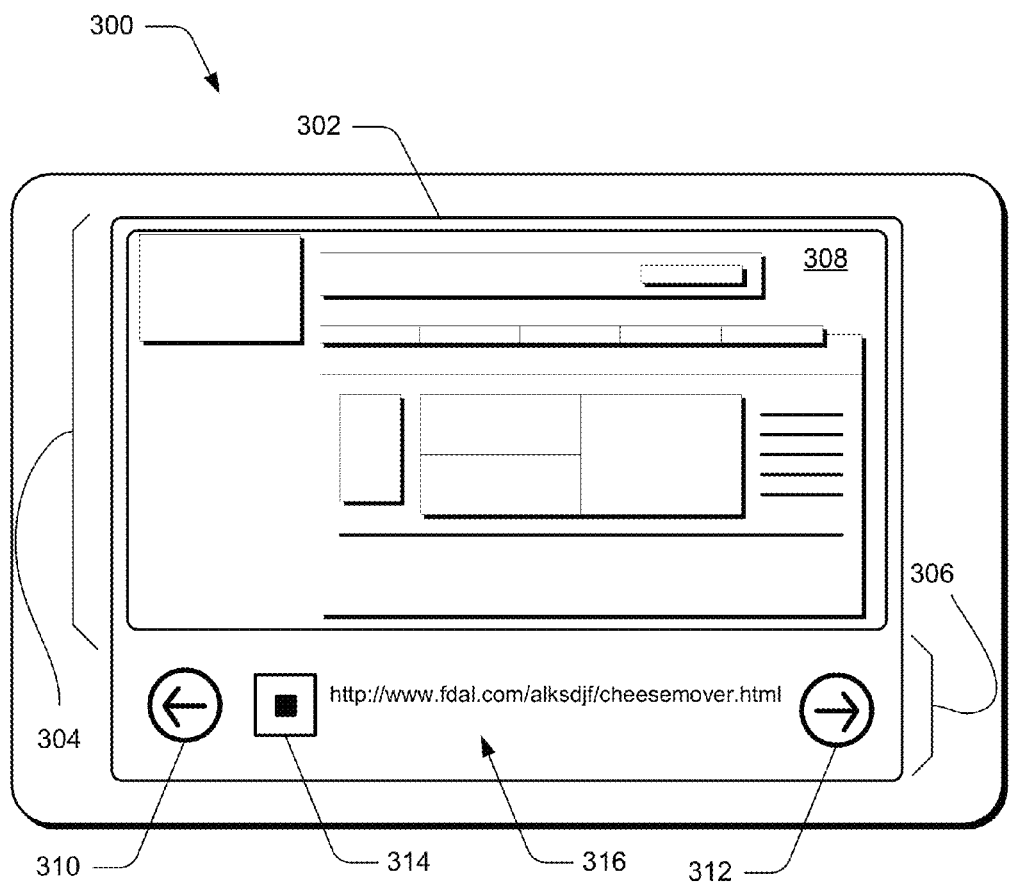
FIG. 3 illustrates an example computing device with a web browser user interface.

FIG. 3 illustrates an example computing device in accordance with one or more embodiments, generally at 300. Computing device 300 includes a web browser that is configured to present a web browser user interface 302. User interface 302 includes a content-rendering area 304 within which web content is rendered and a control area 306 within which navigation instrumentalities and other content is provided. The content rendering area 304 and control area 306 are provided on a display device 308 of the computing device 300.

Control area 306 includes various navigational instrumentalities including, by way of example and not limitation, a backward navigation button 310, a forward navigation button 312, an icon 314 associated with a website, and an address field within which a URL 316 can be displayed.

In operation, when a user navigates to a particular website, the web browser receives an HTML file, parses the HTML file and displays content described in the file in the web browser user interface 302. In one or more embodiments, the web developers can advertise the availability of a particular installable application in a couple of different ways such that the web browser can become knowledgeable of the availability. For example, in at least some embodiments, in-page markup can be utilized to advertise the availability of an application. Accordingly, this approach includes, in the HTML itself, markup indicating the availability of an application. Alternately or additionally, the availability of a particular application associated with the website can be included as part of the HTTP header that is received when the web browser navigates to a particular website.

Figure 4:
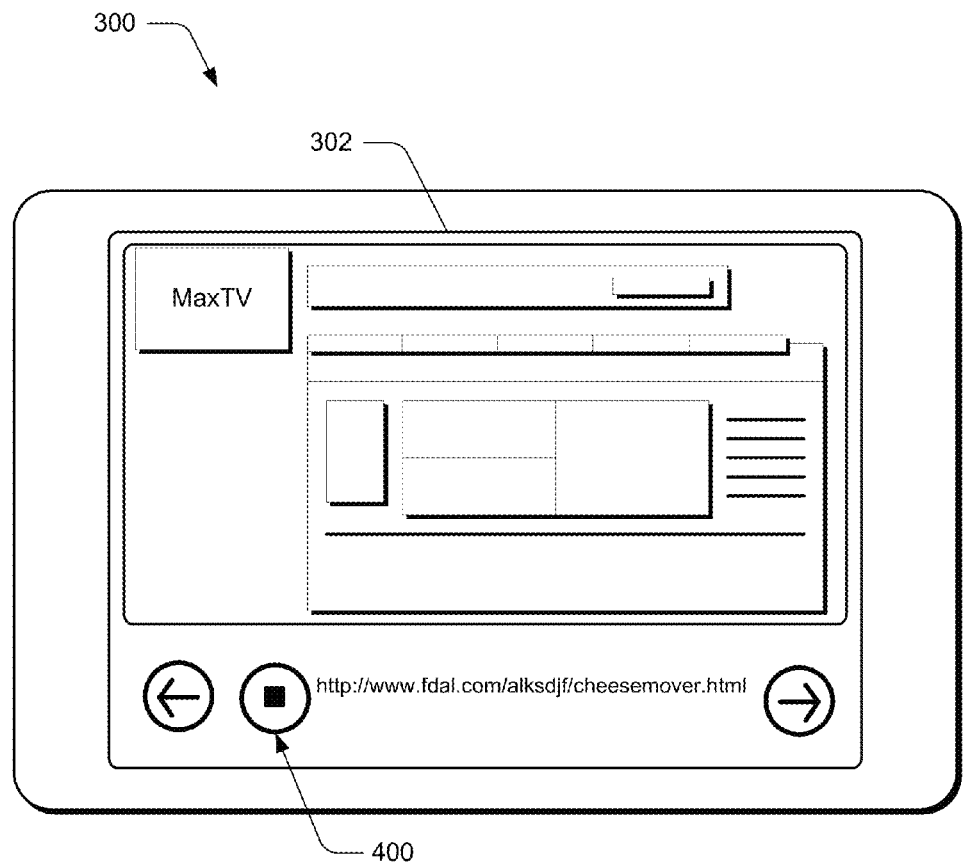
FIG. 4 illustrates an example computing device with a web browser user interface in accordance with one or more embodiments.

Regardless of how the availability of an application is advertised, once the web browser becomes knowledgeable of the availability of an application, the web browser can take steps to inform the user of the availability of an application. As an example, consider FIG. 4, wherein like numerals from FIG. 3 are utilized.

There, computing device 300 includes a button 400 that has replaced icon 314 (FIG. 3). In this instance, the HTML file that was received from a Web server included information or data indicating the availability of an installable application. In this particular example, the user has navigated to a website called "MaxTV". Responsive to learning of the availability of an application associated with the current webpage, button 400 is presented. The button is a user-selectable button that can be selected in any suitable way. In at least some embodiments, a user can touch-select button 400, as in FIG. 5, in order to initiate an acquisition process through which the user can acquire the associated installable application. As an example, consider FIG. 6.

Figure 5:
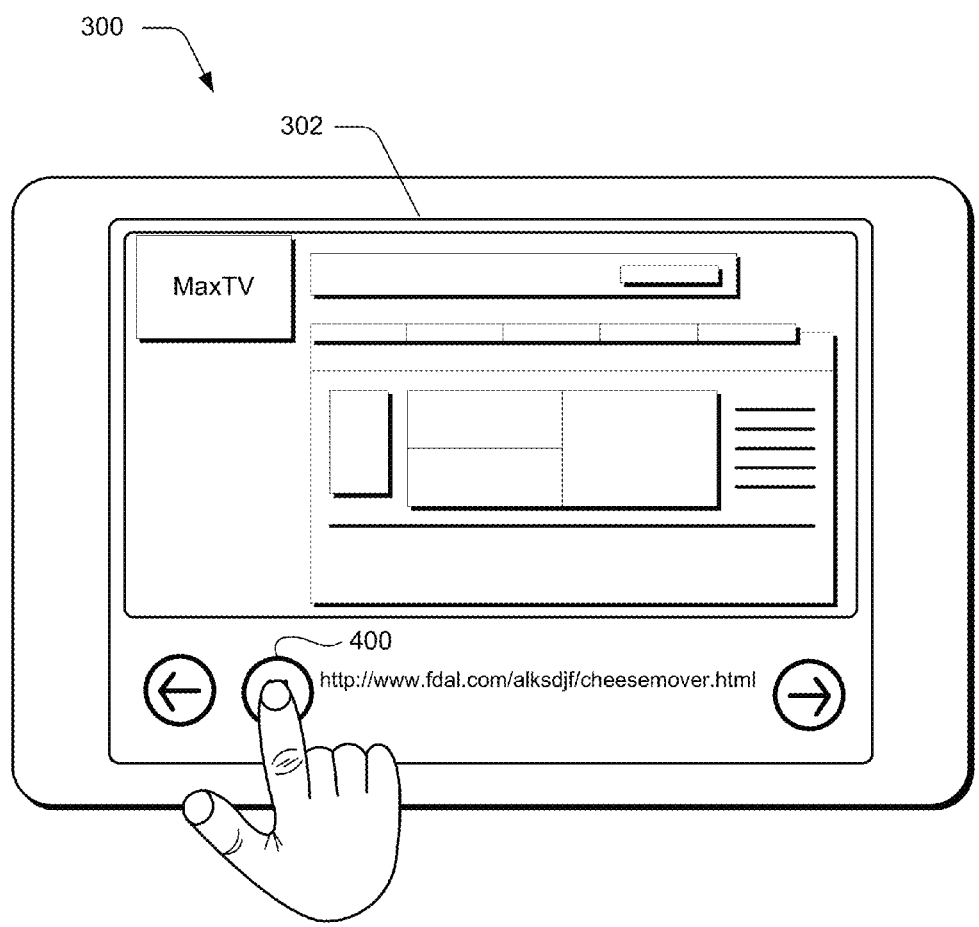
FIG. 5 illustrates an example computing device with a web browser user interface in accordance with one or more embodiments.
Figure 6:
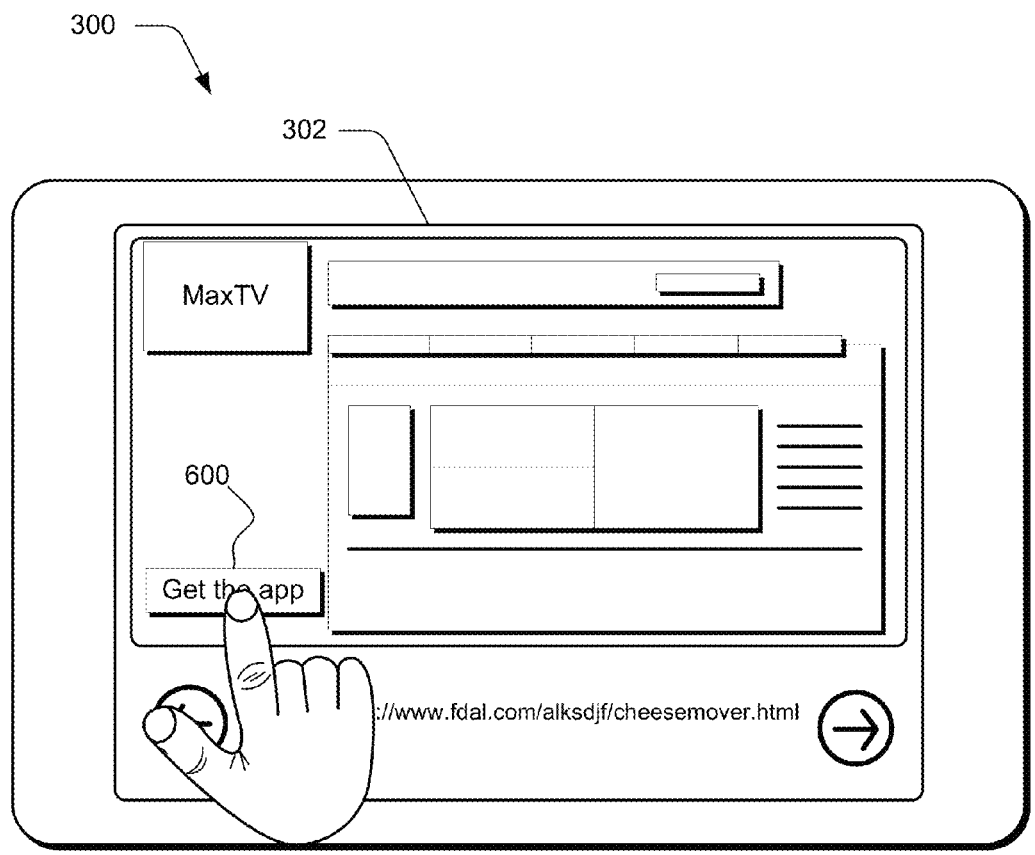
FIG. 6 illustrates an example computing device with a web browser user interface in accordance with one or more embodiments.
Figure 7:
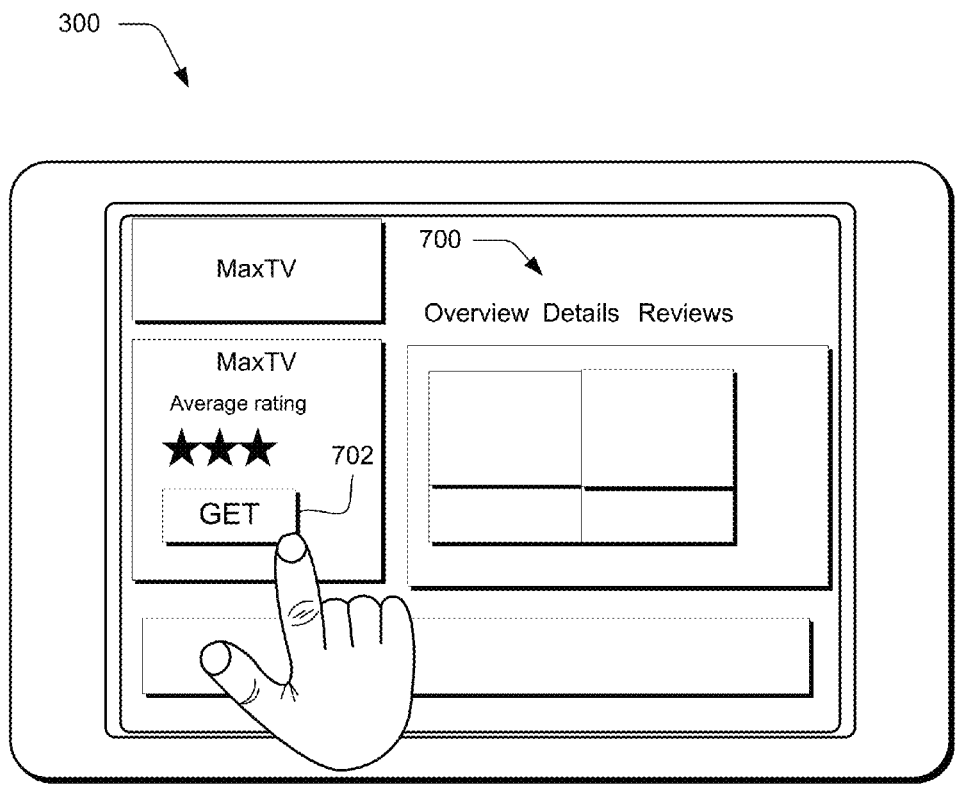
FIG. 7 illustrates an example computing device with a web browser user interface in accordance with one or more embodiments.

There, selectable pop-up display 600 is presented responsive to the user touch-selecting button 400 (FIG. 5). Once the user touch-selects or otherwise selects pop-up display 600, the web browser can navigate to an associated application store to expose the user to an acquisition environment in which the user can acquire the associated application. In one or more embodiments, when the web browser navigates to the application store it includes a globally unique identifier associated with the application the user wishes to acquire. Any suitable type of globally unique identifier can be utilized. In at least some embodiments, the globally unique identifier can include an application ID as well as a product family name that forms a tuple that serves as the globally unique identifier. Using the globally unique identifier, the application store can present the user with an acquisition experience that is specific to the application of interest. As an example, consider FIG. 7.

There, content associated with the application store and, more particularly, the current application of interest, is displayed within the computing device's display device. Notice in this example that additional information is included such as a section 700 with an overview, details, and reviews. A user-selectable display 702 is presented to enable user to purchase or otherwise acquire the application of interest. In this example the display resides in the form of a "get" button. If the user selects this display, the user can acquire the application and have it installed locally on their computing device.

Figure 8:
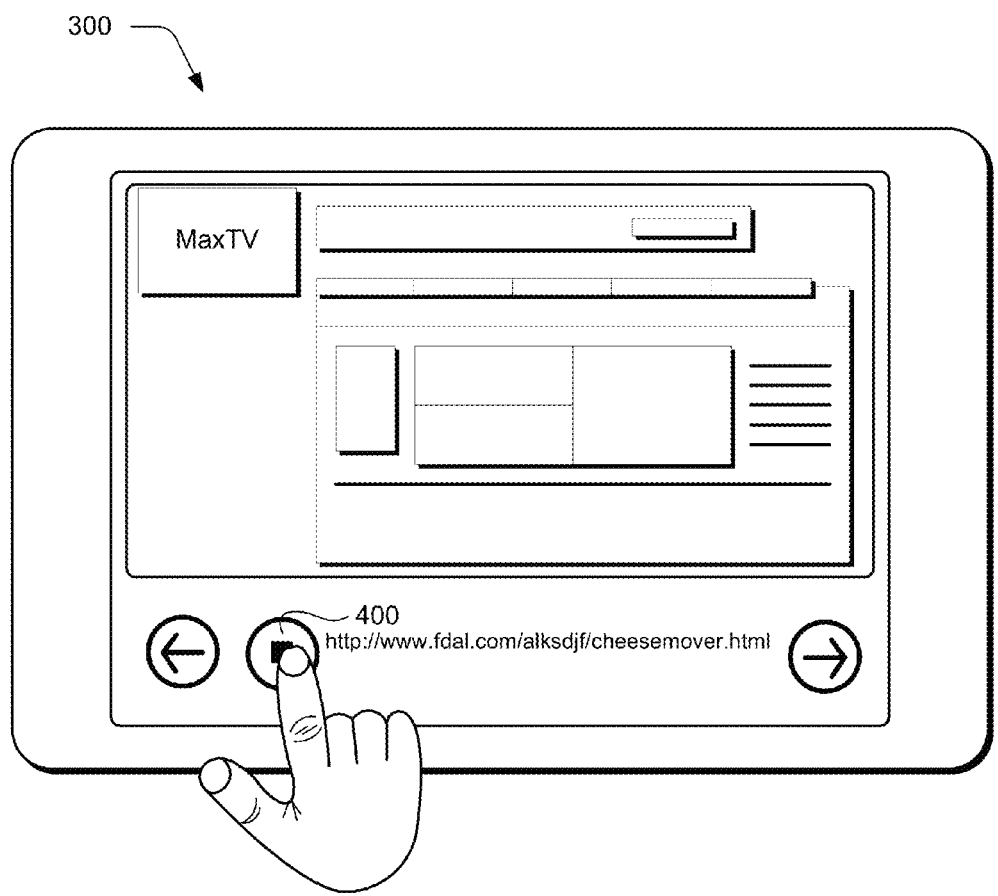
FIG. 8 illustrates an example computing device with a web browser user interface in accordance with one or more embodiments.

Subsequently, when the user navigates to the same website using their web browser, they can be exposed to a different user experience associated with enabling them to switch to the currently installed application. As an example, consider FIG. 8.

Figure 9:
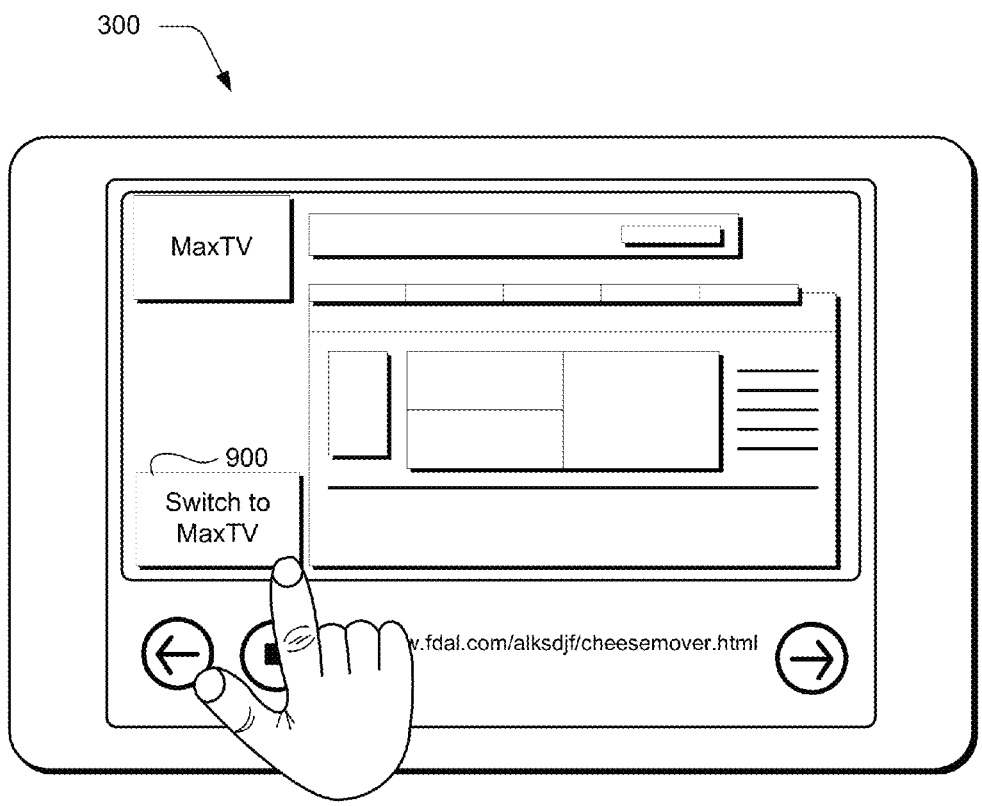
FIG. 9 illustrates an example computing device with a web browser user interface in accordance with one or more embodiments.

There, the user has again navigated to the website associated with "MaxTV" and has touch-selected button 400. Responsive to touch-selecting button 400, the user can be presented with a menu option that provides them the choice of switching to the application since it is currently installed. As an example, consider FIG. 9.

There, a display or button 900 is presented and provides the user with the choice to switch to the associated application. If the user opts to select the button 900, the web browser can enable switching to the associated application.

Figure 10:
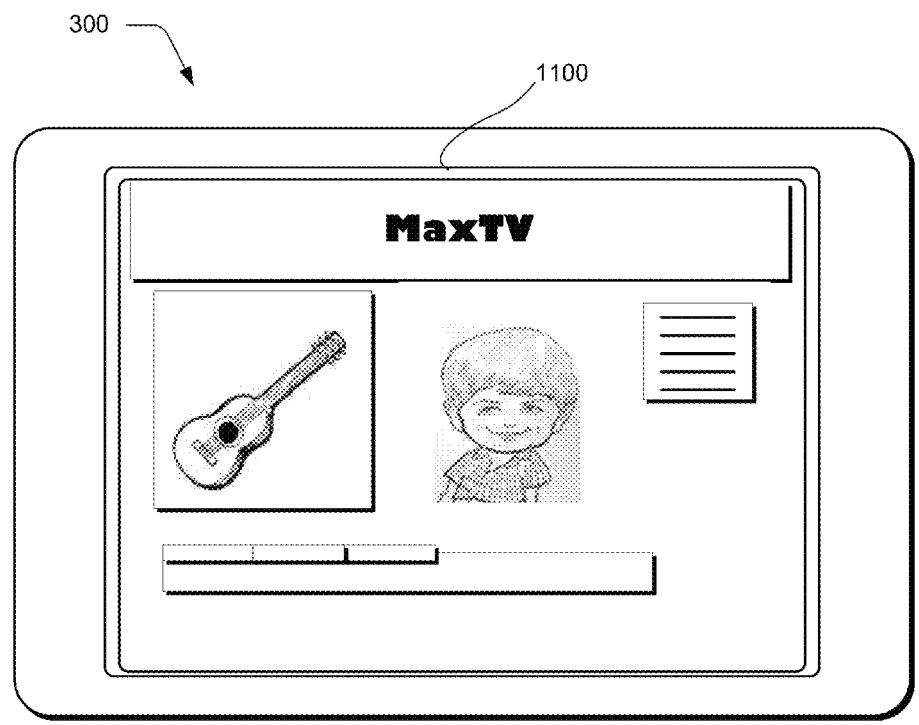
FIG. 10 illustrates an example computing device with a web browser user interface in accordance with one or more embodiments.

In one or more embodiments, when the web browser enables switching to the associated application, the web browser can provide contextual information associated with the state of the current navigation to the application so that the user experience is preserved during and after the transition. Any suitable way of providing contextual information to the application can be utilized. In at least some embodiments, contextual information can be passed to the application by passing the URL associated with the webpage the user was currently consuming. As an example, consider FIG. 10.

There, application content 1000 is displayed within the display device of computing device 300. Here, the application can provide a tailored user experience for the user. In this example, the web browser has been placed in the background and none of the instrumentalities within the control area are displayed. Rather, content of the application is rendered in the manner defined by the application developer. In this particular example, the user interface of the application is a "chromeless" user interface that is devoid of navigation instrumentalities typically associated with a web browser.

Having considered embodiments in which a web browser can facilitate acquisition of and switching to applications, consider now an example method in accordance with one or more embodiments.

Example Method

Figure 11:
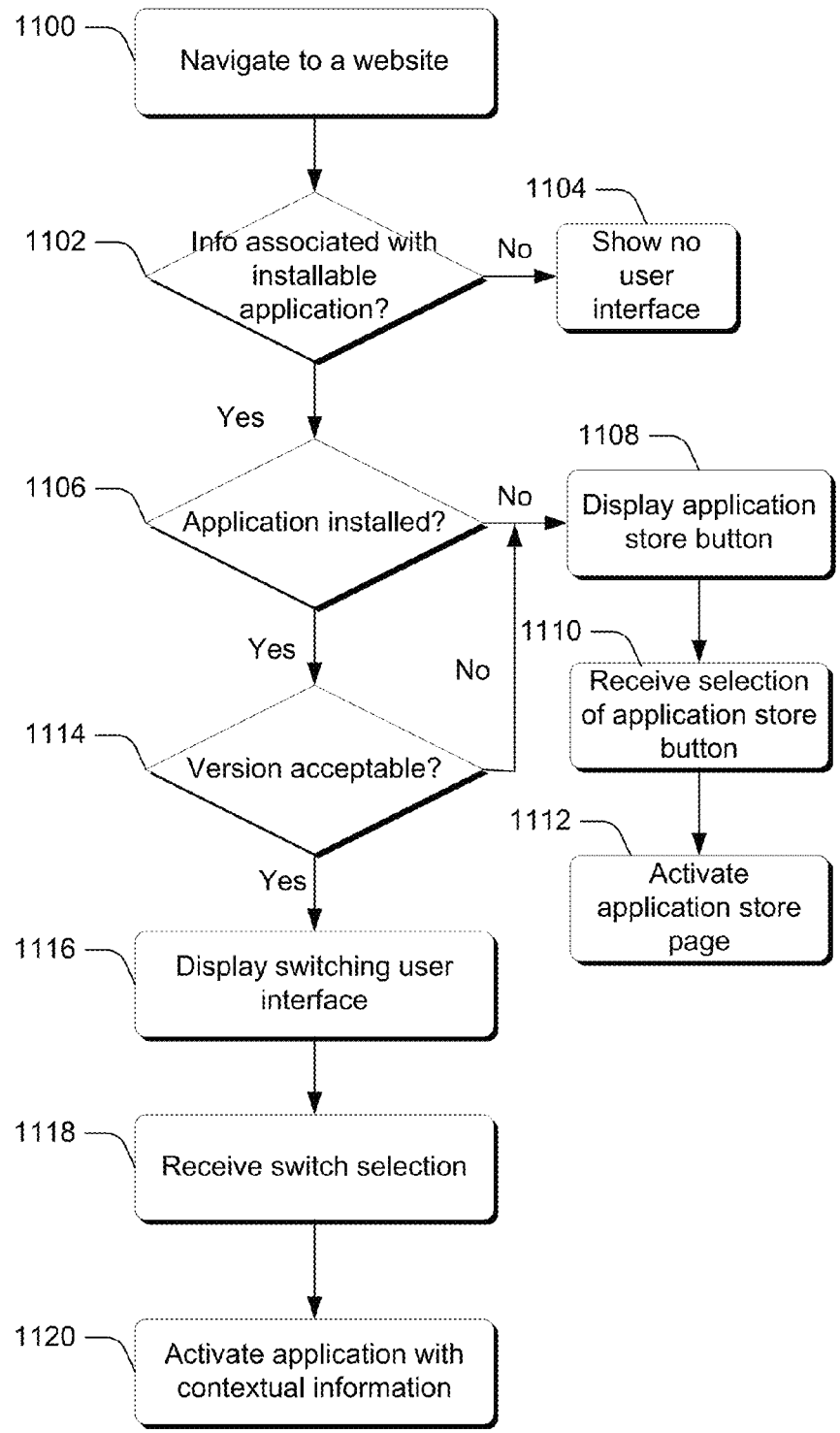
FIG. 11 is a flow diagram that describes steps in a method in accordance with one or more embodiments.

FIG. 11 is a flow diagram that describes steps in a method accordance with one or more embodiments. The method can be performed in connection with any suitable hardware, software, firmware, or combination thereof. In at least some embodiments, the method can be performed by software, e.g., a web browser, embodied on some type of computer-readable storage medium.

Step 1100 navigates to a website. This step can be performed in any suitable way. In the example above, this step is performed, in part, by receiving an HTML file, parsing through the file for file content, and rendering website content in a user interface. Step 1102 ascertains whether the website has any information associated with an installable application. Any suitable type of information can be utilized. In the example above, such information resides in the form of a globally unique identifier that can be provided in the HTML itself. Alternatively, such information can be included in the HTTP header. If there is no information associated with an installable application, step 1104 does not show an associated user interface. If, on the other hand, there is information associated with an installable application, step 1106 ascertains whether the application has been installed. If the application has not been installed, step 1108 displays an application store button sufficient to enable user to navigate to an application store to acquire the installable application. Step 1110 receives selection of the application store button, and step 1112 activates an application store page to expose the user to an acquisition experience in which they can acquire the installable application.

If, on the other hand, the application is installed, step 1114 ascertains whether the version of the installed application is acceptable. For example, a web developer may have modified the application and updated it. If the version is not acceptable by, for example, being out of date, the method branches to step 1108 as described above. If, on the other hand, the version of the installed application is acceptable, step 1116 displays a switching user interface. The switching user interface enables the user to opt to switch to the installed application. An example of such a user interface is described above. Step 1118 receives a switch selection associated with switching to the installed application. Step 1120 activates the installed application with contextual information associated with the user's current webpage. Using the installed application, the user can now have a tailored experience in which their webpage context is preserved.

Having described an example method in accordance with one or more embodiments, consider now a discussion of an example device that can be utilized to implement the embodiments described above.

Example Device

Figure 12:
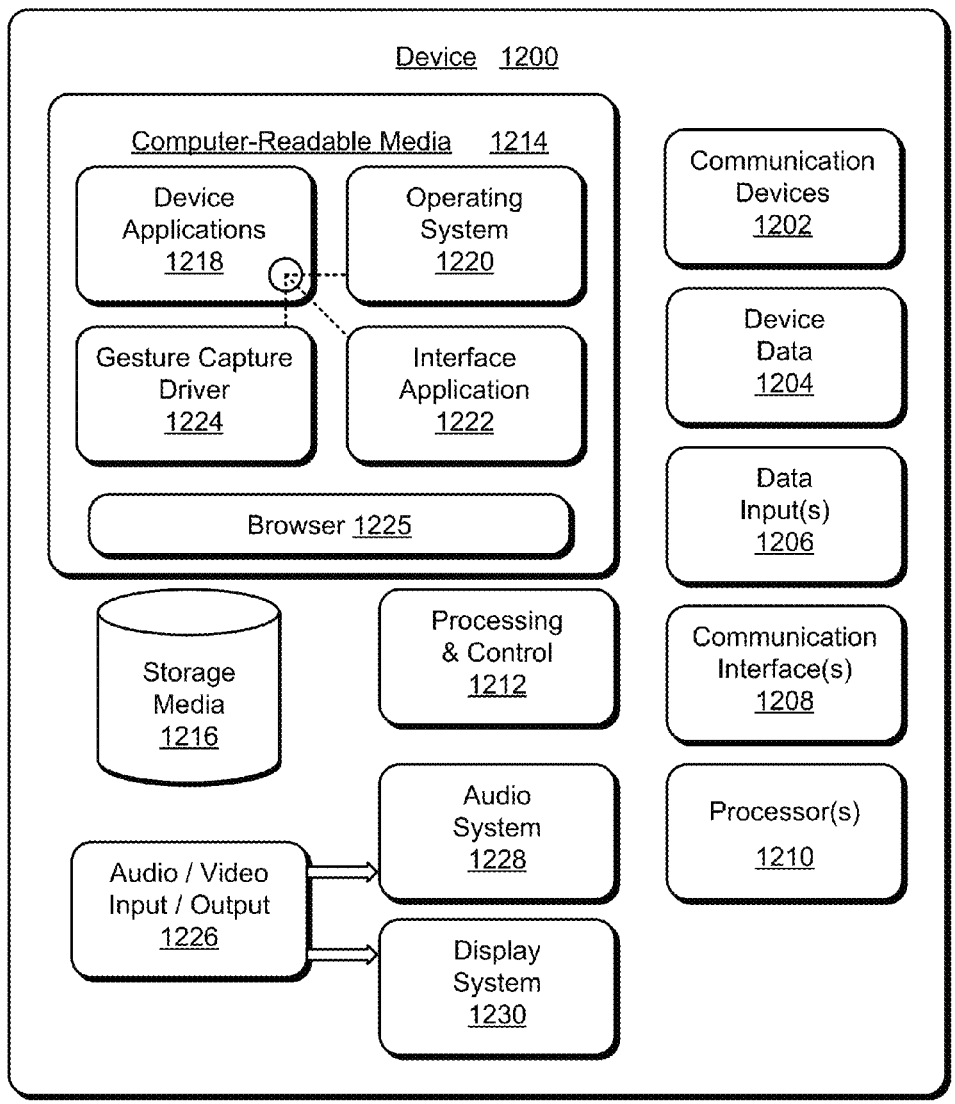
FIG. 12 illustrates an example computing device that can be utilized to implement various embodiments described herein.

FIG. 12 illustrates various components of an example device 1200 that can be implemented as any type of portable and/or computer device as described with reference to FIGS. 1 and 2 to implement the embodiments described herein. Device 1200 includes communication devices 1202 that enable wired and/or wireless communication of device data 1204 (e.g., received data, data that is being received, data scheduled for broadcast, data packets of the data, etc.). The device data 1204 or other device content can include configuration settings of the device, media content stored on the device, and/or information associated with a user of the device. Media content stored on device 1200 can include any type of audio, video, and/or image data. Device 1200 includes one or more data inputs 906 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208 that can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like) which process various computer-executable or readable instructions to control the operation of device 1200 and to implement the embodiments described above. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable media 1214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable media 1214 provides data storage mechanisms to store the device data 1204, as well as various device applications 1218 and any other types of information and/or data related to operational aspects of device 1200. For example, an operating system 1220 can be maintained as a computer application with the computer-readable media 1214 and executed on processors 1210. The device applications 1218 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1218 also include any system components or modules to implement embodiments of the techniques described herein. In this example, the device applications 1218 include an interface application 1222 and a gesture-capture driver 1224 that are shown as software modules and/or computer applications. The gesture-capture driver 1224 is representative of software that is used to provide an interface with a device configured to capture a gesture, such as a touchscreen, track pad, camera, and so on. Alternatively or in addition, the interface application 1222 and the gesture-capture driver 1224 can be implemented as hardware, software, firmware, or any combination thereof. In addition, computer readable media 1214 can include a web browser 1225 that functions as described above.

Device 1200 also includes an audio and/or video input-output system 1226 that provides audio data to an audio system 1228 and/or provides video data to a display system 1230. The audio system 1228 and/or the display system 1230 can include any devices that process, display, and/or otherwise render audio, video, and image data. Video signals and audio signals can be communicated from device 1200 to an audio device and/or to a display device via an RF (radio frequency) link, S-video link, composite video link, component video link, DVI (digital video interface), analog audio connection, or other similar communication link. In an embodiment, the audio system 1228 and/or the display system 1230 are implemented as external components to device 1200. Alternatively, the audio system 1228 and/or the display system 1230 are implemented as integrated components of example device 1200.

CONCLUSION

Various embodiments enable a web browser to promote the availability of an installable application that is associated with a web site to which the web browser has been navigated. The web browser is configured to discover the availability of these applications and, responsively, provide a user experience through which the user can acquire and install such applications, as well as switch to applications that have previously been installed. Thus, through the various embodiments, a user is relieved of the burden of having to navigate to a particular application store and periodically search for applications associated with sites to which they browse.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer system comprising:
one or more hardware processors; and
one or more hardware storage devices having stored thereon computer-executable instructions that are executable by the one or more processors to configure the computer system to discover an installable application associated with a website, the computer-executable instructions including instructions that are executable to configure the computer system to perform at least the following:
navigate, via a web browser having a web browser user interface, to the website having content, the web browser being configured to display a user interface instrumentality associated with the website, the user interface instrumentality having a first viewable appearance configured to be presented when the website does not have an associated installable application and a second different viewable appearance in the location when the website has an associated installable application, the second viewable appearance being user-selectable;
ascertain whether the web browser has become knowledgeable of the availability of the installable application that is associated with the website that can be used to enable consumption of at least some of the content of the website within the installable application;
responsive to ascertaining whether the web browser has become knowledgeable of the availability of the installable application, ascertain, via the web browser, whether the associated installable application has been installed at the computer system;
when the installable application is not installed at the computer system, display, via the web browser, the second different viewable appearance of the user interface instrumentality configured to enable a user to navigate to an application store and have displayed visual information for enabling acquisition of the associated installable application;
when the installable application is installed at the computer system, display the second different viewable appearance of the user interface instrumentality as a switching user interface within the web browser, the switching user interface being configured to enable the user to opt to switch from the web browser to the installed application to display at least some of the website content within the installed application, the web browser being configured to provide to the installed application contextual information associated with a particular webpage within the website that is currently being viewed in the web browser, the contextual information being configured to preserve user context after switching from the web browser to the installed application, by displaying content associated with the particular webpage after switching to the installed application; and
responsive to receiving an option to switch from the web browser to the installed application, replace the web browser user interface with a user interface of the installed application through which the content associated with the particular webpage is presented.

2. The computer system of claim 1, wherein a unique identifier is used to make the web browser knowledgeable of the availability of the installable application associated with the website.

3. The computer system of claim 2, wherein the unique identifier is provided in hypertext markup language (HTML) associated with the website.

4. The computer system of claim 2, wherein the unique identifier is included in a hypertext transport protocol (HTTP) header.

5. The computer system of claim 1, the computer-executable instructions also including instructions that are executable to configure the computer system to, responsive to the installable application associated with the website being installed, ascertain whether an installed version of the associated application is acceptable and, if so, display the switching user interface.

6. The computer system of claim 1, the computer-executable instructions also including instructions that are executable to configure the computer system to, responsive to the installable application associated with the website being installed, ascertain whether an installed version of the associated application is acceptable and, if not, display an application store button.

7. The computer system of claim 1, the computer executable instructions also including instructions that are executable to configure the computer system to, responsive to the installable application associated with the website not being installed and after displaying an application store button, receive selection of the application store button and activate an application store page to expose the user to an acquisition experience in which they can acquire the associated installable application.

8. A method, implemented at a computer system that includes one or more processors, for discovering an installable application associated with a website, the method comprising:
ascertaining whether the website to which a web browser has been navigated has an associated installable application, the website having content that is presented in a user interface of the web browser, the web browser being configured to display a user interface instrumentality associated with the website, the user interface instrumentality being displayed in a location and having a first viewable appearance configured to be presented when the website does not have an associated installable application and a second different viewable appearance in the location when the website has an associated installable application, the second viewable appearance being user-selectable;
responsive to the website having an associated installable application which is not installed, displaying the second user selectable user interface instrumentality, and responsive to receiving a user input, navigating the web browser to an application store webpage that is configured to enable the user to acquire the installable application;
when the associated installable application is installed at the computer system, changing the user interface instrumentality from the first viewable appearance to the second viewable appearance to enable a user to opt to switch from the web browser to the associated installable application using a switching user interface displayed by the web browser, the web browser being configured to provide to the installable application contextual information associated with a particular webpage within the website that is currently being viewed in the web browser, the contextual information being configured to preserve user context after switching from the web browser to the installable application, by displaying content associated with the particular webpage after switching to the installable application, wherein switching from the web browser to the installable application comprises removing the web browser user interface responsive to receiving a switch selection indicating that a switch to the installable application is desired, and replacing the web browser user interface with a user interface of the installable application to enable the content associated with the particular webpage within the website that is currently being viewed in the web browser to be presented by the installable application.

9. The method of claim 8, wherein the ascertaining is performed by identifying a unique identifier associated with the installable application.

10. The method of claim 9, wherein the unique identifier is provided within hypertext markup language (HTML) associated with the website, the unique identifier being associated with the installable application.

11. The method of claim 9, wherein the unique identifier is provided within an hypertext transport protocol (HTTP) header associated with the website, the unique identifier being associated with the installable application.

12. The method of claim 8, further comprising enabling a user to acquire a newer version of the installable application associated with the website.

13. The method of claim 8, wherein the web browser is further configured to provide to the installable application associated with the website a uniform resource locator (URL) associated with the particular webpage within the website that is currently being viewed in the web browser, the installable application being configured to use the URL to present contextual content to the user.

14. A computer-program product comprising one or more hardware storage devices having stored thereon computer-executable instructions that are executable by one or more processors of a computer system to configure the computer system to discover an installable application associated with a website, the computer-executable instructions including instructions that configure the computer system to perform at least the following:

ascertain whether the website to which a web browser has been navigated has an associated installable application that can be used to consume content of the website, the web browser being configured to display a user interface instrumentality in the form of an icon associated with the website that is located adjacent to an address field within which a URL can be displayed, the icon being presented when the website does not have an associated installable application, the web browser further being configured to display a user-selectable button in the location adjacent to the address field when the website has an associated installable application;

when the website has an associated installable application that can be used to consume content of the website, perform at least the following:

responsive to the user-selectable button being selected, enable acquisition of the associated installable application by navigating to an application store webpage in which the installable application can be acquired; and switch from the web browser to the associated installable application, the web browser being configured to provide to the installable application contextual information associated with a particular webpage within the website that is currently being viewed in the web browser, the contextual information being configured to preserve user context after switching from the web browser to the installable application, by displaying content associated with the particular webpage after switching to the installable application, wherein atoll switching from the web browser to the installable application comprises:

receiving a switch selection, responsive to receiving the switch selection, placing the web browser in the background; and presenting content associated with the particular webpage within the website that is currently being viewed in the web browser in a user interface of the installable application.

15. The computer-program product of claim 14, wherein the web browser is configured to ascertain whether the website has an associated installable application by identifying a unique identifier associated with the installable application and acquire the installable application by using the unique identifier.

16. The computer-program product of claim 15, wherein the web browser is further configured to both ascertain whether the website has an associated installable application by identifying a unique identifier within hypertext markup language (HTML) associated with the website, the unique identifier being associated with the installable application, and acquire the installable application by using the unique identifier.

17. The computer-program product of claim 15, wherein the web browser is further configured to both ascertain whether the website has an associated installable application by identifying a unique identifier within an hypertext transport protocol (HTTP) header associated with the website, the unique identifier being associated with the installable application, and acquire the installable application by using the unique identifier.

18. The computer-program product of claim 14, wherein the web browser is configured to enable acquisition of a newer version of the installable application associated with the website.

19. A computer system comprising:

one or more hardware processors; and one or more hardware storage devices having stored thereon computer-executable instructions that are executable by the one or more processors to configure the computer system to discover an installable application associated with a website, the computer-executable instructions including instructions that are executable to configure the computer system to perform at least the following:

navigate to the website;

display a user interface that is configured to enable a user to acquire an installable application associated with the website that can be used to enable consumption of at least some of the content of the website within the associated installable application, the user interface being configured to display a user interface instrumentality associated with the website, the user interface instrumentality being user-selectable to navigate to an application store website;

render content of the application store configured to enable the user to acquire the associated installable application;

display a web browser user interface having navigation instrumentalities, the web browser user interface being configured to enable a user to switch to an acquired installable application; and provide to the installable application contextual information associated with a articular webpage within the website that is currently being viewed in the web browser, the contextual information being configured to preserve user context after switching from the web browser to the installable application, by displaying content associated with the particular webpage after switching to the installable application.

20. The computer system of claim 19, further comprising providing contextual information to the installable application associated with the website that tailors a user's experience within the installable application to an experience associated with the particular webpage within the web site that is currently being viewed in the web browser.

21. The computer system method of claim 19, wherein the contextual information provided to the installable application associated with the website includes a uniform resource locator (URL), the URL being associated with the particular webpage within the website that is currently being viewed in the web browser.

22. The computer system method of claim 19,
wherein the user interface comprises:
a replaceable icon associated with the website; and
a user-selectable button configured to replace the replaceable icon, the user-selectable button being configured to initiate an acquisition process through which information associated with the installable application associated with the website can be displayed and the installable application can be acquired.

23. The computer system of claim 19, wherein switching to the installable application associated with the website comprises removing the web browser user interface having navigation instrumentalities and replacing the web browser user interface with an application user interface that is devoid of at least some of the navigation instrumentalities of the web browser user interface.

* * * * *